United States Patent [19] [11] 3,905,841
Simonetti [45] Sept. 16, 1975

[54] METHOD OF IMPROVING DISPERSABILITY OF SMALL METALLIC MAGNETIC PARTICLES IN ORGANIC RESIN BINDERS

[75] Inventor: Alexander Simonetti, Longmont, Colo.

[73] Assignee: International Business Machines Corporation, Armonk, N.Y.

[22] Filed: Aug. 30, 1973

[21] Appl. No.: 393,258

[52] U.S. Cl. ............ 148/105; 75/.5 AA; 148/31.55; 148/108
[51] Int. Cl.² ............................................ H01F 1/02
[58] Field of Search ........ 148/105, 108, 101, 31.57, 148/31.55; 75/.5 AA, .5 A, .5 R, 119, 121; 117/235; 252/62.54

[56] References Cited

UNITED STATES PATENTS

| | | | |
|---|---|---|---|
| 1,878,589 | 9/1932 | Marris et al. | 148/105 |
| 3,558,371 | 1/1971 | Becker | 148/101 |
| 3,756,866 | 9/1973 | Parker et al. | 148/105 |

*Primary Examiner*—Walter R. Satterfield
*Attorney, Agent, or Firm*—Donald W. Margolis

[57] ABSTRACT

Magnetic cobalt-phosphorous particles formed by chemical oxidation-reduction are found to agglomerate and not to disperse homogeneously when mixed with organic resin binders. When the same type of cobalt-phosphorous particles are treated with a sulfuric acid containing solution and then incorporated into an organic resin binder, the resulting mixture exhibits homogeneous dispersion characteristics.

11 Claims, 2 Drawing Figures

METHOD OF IMPROVING DISPERSABILITY OF SMALL METALLIC MAGNETIC PARTICLES IN ORGANIC RESIN BINDERS

BACKGROUND OF THE INVENTION

1. Field of the Invention

This invention relates to a method for treating finely divided metallic magnetic cobalt-phosphorous alloy particles to alter and improve the dispersion characteristics of the particles in organic resin binders. The invention also relates to homogeneous binder mixtures including such modified particles and also to articles manufactured utilizing such homogeneous magnetic particle and resin mixtures. Such treated particles and particle and resin mixtures are suitable for use, for example, in the preparation of magnetic recording media.

2. Description of the Prior Art

In the prior art, magnetic particles of cobalt-phosphorous have been prepared by subjecting a solution containing cobalt cations to chemical reduction by the controlled action of a hypophosphite reducing agent. The reaction mixture normally includes small amounts of catalytic material, and utilizes temperature, pH, and concentration parameters to vary the physical and magnetic properties of the particles. The catalytic material most often used during controlled chemical reduction of cobalt salts to form particles has been palladium and its salts. The resulting cobalt-phosphorous particles are usually small, on the order of 0.1 to 3.0 microns in diameter, and generally uniform in size over a small range. However, the small uniform particles are found not to disperse homogeneously in an organic resin binder. It is not understood whether the difficulty of dispersion is due to the surface characteristics of the particles, vis-a-vis the binder, the high density of the particles as compared to the density of the organic resin and its solvent, the magnetic attraction between the particles, or due to some other characteristic. In any event, when the prior art cobalt-phosphorous particles are mixed with organic resin binder and solvent, even following milling or mixing for many hours, the resulting mixture is non-uniform, heterogeneous, and appears to include a few discontinuous and relatively large clumps of agglomerated particles rather than many small homogeneously dispersed individual particles. Where such a mixture is utilized to prepare magnetic recording media, the non-uniform nature of the dispersion results in disappointingly low signal output from the media.

Elsewhere in the prior art, techniques are taught for chemically treating magnetic cobalt-rare earth intermetallic compounds to produce particles having increased coercive forces. The techniques generally provide for the mechanical comminution of bulk magnetic cobalt-rare earth intermetallic materials, followed by the chemical treatment of the powder. Techniques for the chemical treatment of the powder include the use of an acid or acid mixtures, with or without corrosion inhibitors, to increase the coercivity of the powders. The treatments also result in particles which are either eroded or smoothed, and which are reduced in size, but unchanged in chemical composition. Treated particles are generally useful, for example, in the preparation of permanent magnets. There is no teaching that such chemical treatment affects the dispersion characteristics of the particles in a resin binder, or that any one acid, such as sulfuric acid, affects the characteristics of the particles differently than any other acid.

SUMMARY OF THE INVENTION

It is an object of the present invention to provide new and improved techniques for treating magnetic cobalt-phosphorous alloy particles to render them more uniformly dispersable in an organic resin binder.

Another object of this invention is to provide homogeneous, well dispersed mixtures of cobalt-phosphorous and organic resin with reduced milling time for use in the preparation of magnetic recording media with improved signal output.

These and other objects are accomplished in accordance with the broad aspects of the present invention by first preparing cobalt-phosphorous magnetic particles from any soluble cobalt salt in solution with any soluble source of hypophosphite anion in accordance with any of the techniques known in the art. Then, in accordance with the present invention, the resulting finely divided cobalt-phosphorous alloy particles are treated with a solution containing sulfuric acid. The operating ranges are broad and require no control other than that the desired improvement in dispersion characteristics be achieved. The sulfuric acid treatment can vary as to time, temperature, acid concentration, and the presence or absence of other constituents or water in the treating solution. Percentage weight loss of the dry cobalt-phosphorous particles is considered indicative of the degree of treatment. Amounts of weight loss of 10% or less begin to provide particles with improved dispersion characteristics. Particles treated in accordance with the teachings of this invention which show a weight loss of from about 35 to about 50% exhibit preferred improved dispersion characteristics in an organic resin binder. Greater amounts of weight loss achieve a similar result, but provide a greater loss of raw materials without any significant improvement in dispersion characteristics. Small uniform cobalt-phosphorous alloy particles having improved dispersion characteristics in organic resin binders are formed by this technique.

In preferred embodiments a stoichiometric amount of sulfuric acid containing solution is determined and utilized to achieve a desired percentage weight loss. Where the stoichiometry is thus controlled, the reaction can be allowed to proceed to completion without any concern as to the reaction time and temperature, although about 13 minutes at about 45° to about 52°C is considered an adequate time and preferred temperature to complete such a reaction.

It is generally noted that cobalt-phosphorous particles treated in accordance with the present invention, when viewed under high magnification, appear more translucent than untreated cobalt-phosphorous particles. Furthermore, the treated particles are modified chemically in that the percentage of cobalt in the treated particles is smaller and the percentage of phosphorous is greater than that in untreated particles.

Finally, it has been determined experimentally that weight reducing mixtures, other than sulfuric acid containing solutions, do not materially improve the dispersion characteristic of cobalt-phosphorous particles in organic resins. Treatment of cobalt-phosphorous particles with acids, other than sulfuric acid containing solutions, provide particles which agglomerate and disperse heterogeneously in organic resin binders in much the same way as untreated particles.

The foregoing and other objects, features and advantages of this invention will be apparent from the following more particular description of preferred embodiments of the invention, and from the accompanying photographs.

DESCRIPTION OF THE PREFERRED EMBODIMENTS

Figure 1:
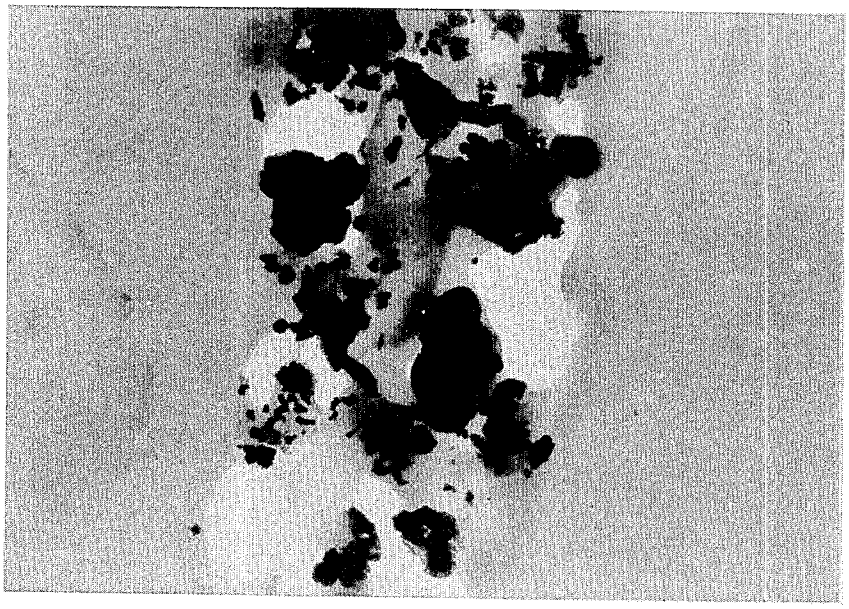
FIG. 1 PRIOR ART
FIG. 1 is a photomicrograph, enlarged 19,000 times, of a transverse microtome section of magnetic recording media prepared from prior art untreated cobalt-phosphorous particles dispersed in an organic resin and milled for 20 hours prior to coating on a substrate.

In the preparation of the cobalt-phosphorous particles, the reactants are brought together rapidly and completely utilizing agitation via stirring. An external magnetic field may be present during particle formation. Particles of cobalt-phosphorous are magnetically separated from the reaction mixture, preferably with an electromagnet, washed with water and organic solvents, and are then dried, usually under non-oxidizing conditions. Subsequently, in accordance with the present invention, the dried particles are reacted with a solution containing sulfuric acid. As previously noted, it is preferred to use stoichiometric amounts of acid. Where the reaction is not stoichiometrically controlled, it is quenched with large volumes of water. Once the sulfuric acid solution treatment is completed, the treated particles are washed with water and solvents and dried under nonoxidizing conditions.

Both before and after the sulfuric acid treatment of the present invention, the powder samples are measured, for example, with a vibrating sample magnetometer, VSM, to determine their magnetic properties. Determination of the chemical content of the alloy particles, both before and after acid treatment, was obtained by wet chemical analysis. Particle sizes and shapes and dispersion of the particles in resin were determined from electron micrographs.

In the preparation of the untreated cobalt-phosphorous particles, the cobalt cations are provided by the use of any suitable soluble cobalt salt, such as cobalt chloride, cobalt sulfate, cobalt acetate, cobalt sulfamate and others. The hypophosphite anion is normally brought into solution in the form of an alkaline metal hypophosphite. In the most common preparations of cobalt-phosphorous, weak complexing agents, such as citrates and malonates, are brought into solution in the form of the acid or as an alkaline metal salt in varying ion concentrations. Hydroxide ions are utilized in the solution to maintain a basic reaction system with ammonium hydroxide preferred. Where catalysts, such as palladium and its salts are utilized, palladium metal can often be found in small quantities in the particles along with the cobalt and phosphorous.

The teaching of the present invention, while directed to the treatment of "cobalt-phosphorous" alloys, is equally applicable to and intended to include cobalt-phosphorous with minor amounts of included catalytic metal.

The following examples are given merely to aid in the understanding of the invention, and variations may be made by one skilled in the art without departing from the spirit of the present invention.

EXAMPLE I

Cobalt-Phosphorous Particle Preparation

An aqueous 1 liter solution containing 35 grams cobalt sulfate ($CoSO_4 \cdot 7H_2O$), 70 grams sodium citrate ($Na_3C_6H_5O_7 \cdot 2H_2O$), 40 grams sodium hypophosphite ($NaH_2PO_2 \cdot H_2O$) and 20 milliliters of a 0.1% palladium chloride ($PdCl_2$) — hydrochloric acid ($HCl$) solution was prepared and heated to about 80° to 85°C. To this solution was added 50 milliliters of concentrated ammonium hydroxide ($NH_4OH$) with stirring. A deep blue gelatinous flocculate formed immediately around the stream of ammonium hydroxide as it entered the solution. Then, within 15 to 30 seconds following the addition of the ammonium hydroxide, the mixture began to react vigorously with the evolution of gas and the precipitation of finely divided dark gray particles. This reaction was allowed to proceed for about 6 minutes after which time the reaction mixture was quenched with large volumes of water. The dark precipitate was then removed from the reaction mixture utilizing an electromagnet. The particles were then washed thoroughly with water followed by a washing with isopropyl alcohol, and dried as completely as possible under non-oxidizing conditions.

A portion of the resulting particles were packed in a glass cylinder for measurement of magnetic properties by the VSM. The particles were found to exhibit an average intrinsic coercive force of 504 oersteds and a squareness ratio of 0.76. Electron micrographs of the powder indicated that it consisted of particles about 0.1 to about 3 microns in diameter. Wet chemical analysis indicated that the particles were alloys including about 90.2% cobalt, about 4.6% phosphorous, and about 0.16% palladium. The balance of the particle was not identified, but may have been oxygen at the surface of the particles or adsorbed water.

EXAMPLE II

Sulfuric Acid Treatment of Cobalt-Phosphorous Particles

The reaction of Example I was scaled-up to yield about 1.5 pounds of dry particles during each reaction and repeated a number of times until a batch of approximately 9 pounds (4082 grams) of dry cobalt-phosphorous was available. The several samples prepared had a coercivity range of about 486 to about 521 oersteds and a squareness ratio range of about 0.73 to about 0.79.

This large quantity of powder was placed in a large vat and 25 gallons (94.5 liters) of water added. The mixture was heated to about 46°C and then 5.4 pounds (2,459 grams) of 97% concentrated sulfuric acid ($H_2SO_4$) having a density of 1.83 grams/cc was added to the mixture. The volume of the sulfuric acid was approximately 1,339 milliliters. This mixture was maintained with mechanical stirring for approximately 13 minutes. During the first several minutes after the addition of sulfuric acid, a vigorous reaction with the evolution of gas took place. Subsequently, and before the end of the 13 minute time period, all visible signs of reaction had ceased. It is assumed that the reaction proceeded stoichiometrically to completion. During the reaction it was noted that the liquid in the reaction vessel took on a pink coloration.

Subsequently, a magnetic field was introduced externally at the bottom of the reaction vessel causing the magnetic particles to quickly settle to the bottom of the vessel. The supernatant mother liquid was then decanted from the vessel and the particles were subsequently washed 3 times with 30 gallons of water during each washing. During the third washing, the water appeared to be free from any pink coloration or non-magnetic ingredients. The still-wet particles were then rinsed with isopropyl alcohol, filtered, and the filtrate maintained moist with alcohol. The alcohol-wet particles were then spread thin in stainless steel trays and placed into a preheated vacuum oven at a temperature of about 55° to 60°C in an atmosphere of carbon dioxide ($CO_2$) gas for one-half hour. Following this initial drying, the gas was evacuated from the vacuum oven and heating was continued under vacuum conditions until dry. After the particles were cooled, they were flushed with carbon dioxide, removed from the vacuum oven, and exposed to air with no signs of pyrophoricity.

When the particles were weighed, only 5.7 pounds (1549 grams) of particles were found to remain. Thus this treatment provided a weight loss of approximately 37% from the original 9-pound powder weight. This is slightly more than the approximately 35% weight loss which was expected from the stoichiometric reaction of sulfuric acid with cobalt. The additional loss is assumed to be due to loss of particles during washing and handling procedures.

Treated cobalt-phosphorous particles, when viewed under an electron microscope, were found to be slightly more translucent than untreated cobalt-phosphorous particles of a similar kind. Analysis of the treated particles indicated that there was a change in their chemical makeup. Cobalt content was decreased to about 88.1%, with the result that phosphorous content appeared increased to 5.7% and palladium content increased to about 0.26%. The bulk magnetic characteristics of the particles were increased slightly by the etching reaction. The etched particles exhibited an intrinsic coercivity of about 594 oersteds, and a squareness ratio of 0.74. A decrease in magnetization per gram or sigma value was noted.

EXAMPLE III

Dispersion of Treated Particles and Untreated Particles in a Resin Binder

The sulfuric acid treated particles prepared in Example II were blended into a mixture of elastomeric linear polyester polyurethane dissolved in methyl ethyl ketone and ethylene glycol monomethyl ether acetate, with the particles constituting about 40% by volume of the solids in the mixture. Following attriting of the mixture for 2 hours, polyfunctional isocyanate was blended into the mixture and the composition coated on a flexible substrate and allowed to dry. The dry thickness of the coating was approximately 150 microinches thick, and when slit to tape, was a suitable magnetic recording media.

Figure 2:
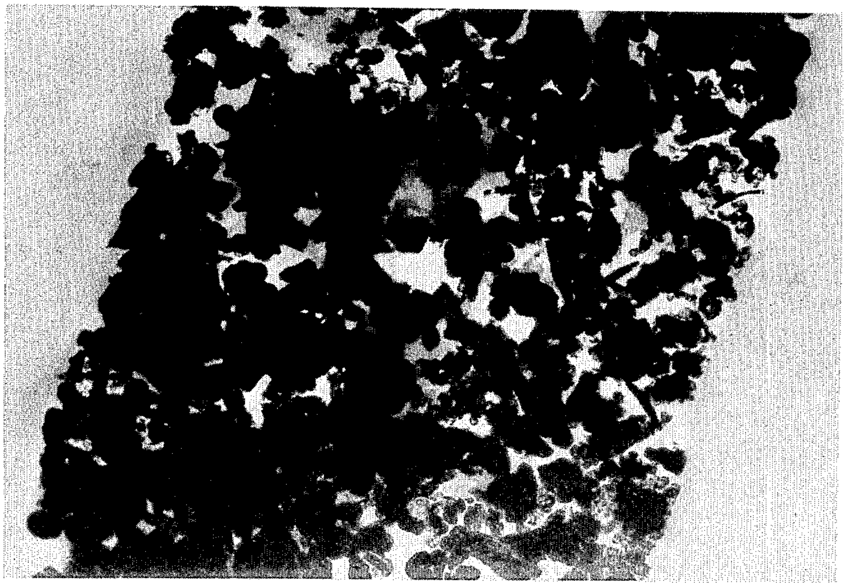
FIG. 2 is a photomicrograph, enlarged 21,500 times, of a transverse microtome section of magnetic recording media prepared from sulfuric acid treated cobalt-phosphorous particles dispersed in an organic resin and milled for 2 hours prior to coating on a substrate.

FIG. 2 represents a photomicrograph of a transverse microtome of the media viewed through an electron microscope at a magnification of 21,500 times. Referring to FIG. 2, it can be seen that the particles are well dispersed throughout the entire coating mixture in a homogeneous dispersion and with few signs of agglomerations or voids. When used for recording, the media itself exhibited good signal output and smoothness, with a center-line average of 2.7 microinches as measured by a Talysurf device.

When particles from Example I are dispersed, attrited for 20 hours, and coated in a similar resin binder, without the treatment step of Example II, the resulting mixture is found to be poorly dispersed, as shown in FIG. 1. FIG. 1 shows a photomicrograph of a transverse microtome of a magnetic media coating produced in a manner similar to the media described above at a magnification of 19,000 times. It will be noted that the untreated magnetic material is formed into large agglomerates heterogeneously dispersed throughout the binder. When utilized as a magnetic recording media, the signal output from the untreated sample is not as great as the signal output from the media made utilizing sulfuric acid treated cobalt-phosphorous particles. Furthermore, the media is not as smooth as the media made utilizing the treated particles, the untreated particle media showing a center-line average of 7.0 microinches, as measured by the same Talysurf device.

The techniques of the foregoing examples were repeated several times with a high degree of reproducibility between the experiments.

The reaction of Example II can be controlled in several ways. A large quantity of acid can be added to the particles and the reaction allowed to proceed for a period of time and then quenched. In that situation, time, temperature, and acid concentration are all interrelated factors affecting the resulting treated particles. As experimentation has indicated that treatments yielding weight losses of about 35 to about 50% give preferred effects on dispersion, it becomes a simple matter to calculate an appropriate amount of etchant to stoichiometrically affect the amount of weight loss desired. Utilization of stoichiometric amounts of sulfuric acid containing solution provides a reaction system in which time and acid concentration are no longer factors to be concerned with in the treatment of the particles.

It would appear likely that other acids and etching materials could be utilized to obtain the same results as the sulfuric acid etching solution taught by the present invention. This is not the case. Only solutions containing sulfuric acid as an etching ingredient have been found to improve dispersion characteristics of cobalt-phosphorous particles to a significant degree. Experiments utilizing aluminum chloride, ferrous chloride, nitric acid, hydrochloric acid, ammonium chloride, ammonium sulfate, sodium hydroxide, ammonium hydroxide, sodium chloride, and phosphoric acid as etching materials were found not to notably affect the dispersion characteristics of the particles.

However, it was also determined that the addition of other ingredients to the sulfuric acid containing solution, such as aluminum chloride, did not destroy the ability of the sulfuric acid containing solution to render the cobalt-phosphorous particles more easily dispersable. In fact, the addition of other etchants to sulfuric acid solutions allowed for a reduction in the amount of sulfuric acid required in order to obtain the desired percent weight loss in the cobalt-phosphorous particles. Therefore, the specific makeup of the sulfuric acid containing solution utilized in treating the particles in a matter of technical choice.

An external magnetic field affecting the reaction mixture during the formation of the cobalt-phosphorous alloy can be used in the reaction of Example I to enhance the character of the particles formed, but it is not an essential feature of this invention.

Uses for the materials produced in accordance with the teaching of this invention are well known. The sulfuric acid treated cobalt-phosphorous alloy particles produced by the foregoing examples may be quickly and homogeneously dispersed with non-magnetic organic film-forming materials and their solvents. Typical, but not limiting, binders for preparing various recording media including ferromagnetic particles produced in accordance with this invention are phenoxies, epoxies, polyesters, cellulose esters and ethers, vinyl chloride, vinyl acetate, acrylate and styrene polymers and copolymers, polyurethanes, polyamides, aromatic polycarbonates, polyphenyl ethers and various mixtures thereof. A wide variety of solvents may be used for forming a dispersion of the ferromagnetic particles and binders. In addition to those taught in Example II organic solvents, such as ethyl, butyl, and amyl acetate, isopropyl alcohol, dioxane, acetone, methylisobutyl ketone, cyclohexanone, tetrahydrofuran and toluene are useful for this purpose.

The particle-binder dispersion may be applied to a suitable substrate by roller coating, gravure coating, knife coating, extrusion, or spraying of the mixture onto the backing, or by other known methods. The specific choice of non-magnetic substrate, binder, solvent, or method of application of the magnetic composition to the support will vary with the properties desired and the specific form of the magnetic recording medium being produced.

In preparing recording media, the treated magnetic particles of the present invention usually comprise about 40 to 90%, by weight, of the solids in the film layer applied to the substrate. The substrate is usually a flexible resin, such as polyester or cellulose acetate material; although other flexible materials as well as rigid base materials are more suitable for some uses.

While the invention has been particularly shown and described with reference to preferred embodiments thereof, it will be understood by those skilled in the art that various changes in form and details may be made therein without departing from the spirit and scope of the invention.

What is claimed is:

1. The method of producing finely divided metallic magnetic cobalt-phosphorous particles having substantially homogeneous dispersability in organic resin binders, said cobalt-phosphorous having been prepared by reacting a solution including hypophosphite anion reducing agent, and cobalt cations which are reduceable to cobalt metal by said hypophosphite, wherein the improvement comprises;

reacting said cobalt-phosphorous particles with sulfuric acid to reduce the relative percentage of cobalt and increase the relative percentage of phosphorous and to improve the dispersion characteristics of said cobalt-phosphorous in organic resin.

2. The method of claim 1 wherein the total dry weight of the cobalt-phosphorous particles is reduced by at least about 10%.

3. The method of claim 1 wherein the total dry weight of the cobalt-phosphorous particles is reduced within the range of about 35 to about 50%.

4. The method of claim 1 wherein, after the particles are treated with sulfuric acid, said particles are maintained moist with an organic solvent and dried in a non-oxidizing atmosphere in the presence of carbon dioxide.

5. The method of claim 1 wherein the reaction is initiated at about 45°C.

6. The method of claim 1 wherein aluminum chloride is an additional etchant.

7. A method for producing finely divided metallic magnetic cobalt-phosphorous particles which are easily homogeneously dispersable in organic resin binders, said process comprising:

preparing cobalt-phosphorous particles from a reaction mixture consisting essentially of reduceable cobalt cations and hypophosphite anions as a reducing agent;

separating the resulting cobalt-phosphorous particles from said reaction mixture;

providing sulfuric acid a volume and concentration sufficient to react with and dissolve from about 35 to about 50%, by weight, of said cobalt-phosphorous;

reacting said sulfuric acid and said cobalt-phosphorous particles stoichiometrically at a temperature of about 45°C; and then removing the remaining cobalt-phosphorous particles from solution and drying them under nonoxidizing conditions in the presence of carbon dioxide.

8. A method of making a well dispersed substantially homogeneous coating composition suitable for use in the manufacture of magnetic reducing media consisting of the steps of:

bringing together particles produced in accordance with claim 1 and an organic resin binder and solvent; and then mechanically mixing said particles and resin to produce a well dispersed mixture.

9. A method of making a well dispersed substantially homogeneous coating composition suitable for use in the manufacture of magnetic recording media consisting of the steps of:

bringing together particles produced in accordance with claim 7 and an organic resin binder and solvent; and then mechanically mixing said particles and resin to produce a well dispersed substantially homogeneous mixture.

10. The method of claim 9 wherein the binder is polyurethane.

11. The method of making a magnetic recording media consisting of the steps of:

coating the mixture of claim 10 onto a substrate; and then drying the coating.

* * * * *

UNITED STATES PATENT OFFICE

CERTIFICATE OF CORRECTION

PATENT NO. : 3,905,841
DATED : September 16, 1975
INVENTOR(S) : Alexander Simonetti It is certified that error appears in the above-identified patent and that said Letters Patent are hereby corrected as shown below:

Col. 8, line 39, reducing should be --recording--.

Col. 8, line 45, after "dispersed" insert --substantially homogeneous--.

Signed and Sealed this

Sixth Day of July 1976

[SEAL]

*Attest:*

RUTH C. MASON
*Attesting Officer*

C. MARSHALL DANN
*Commissioner of Patents and Trademarks*